United States Patent
Alexandrovichserov

(10) Patent No.: US 7,955,756 B2
(45) Date of Patent: Jun. 7, 2011

(54) CATALYST FOR A FUEL CELL, A METHOD OF PREPARING THE SAME, AND A MEMBRANE-ELECTRODE ASSEMBLY FOR A FUEL CELL AND A FUEL CELL SYSTEM INCLUDING THE SAME

(75) Inventor: Alexey Alexandrovichserov, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1043 days.

(21) Appl. No.: 11/806,040

(22) Filed: May 29, 2007

(65) Prior Publication Data
US 2007/0275290 A1    Nov. 29, 2007

(30) Foreign Application Priority Data
May 29, 2006 (KR) .................. 10-2006-0048146

(51) Int. Cl.
*H01M 4/02* (2006.01)

(52) U.S. Cl. ......... 429/526; 429/484; 429/485; 429/522

(58) Field of Classification Search .......... 429/484, 429/485, 522, 526
See application file for complete search history.

(56) References Cited

U.S. PATENT DOCUMENTS

| | | | |
|---|---|---|---|
| 2004/0062974 A1* | 4/2004 | Abd Elhamid et al. | 429/34 |
| 2004/0081876 A1* | 4/2004 | Fenton et al. | 429/30 |
| 2004/0096728 A1* | 5/2004 | Campbell | 429/40 |
| 2007/0212592 A1 | 9/2007 | Alexandrovichserov et al. | |
| 2007/0218350 A1 | 9/2007 | Alexandrovichserov et al. | |
| 2007/0264560 A1 | 11/2007 | Alexandrovichserov et al. | |
| 2008/0090118 A1 | 4/2008 | Gorobinskiy et al. | |
| 2008/0152979 A1 | 6/2008 | Alexandrovichserov et al. | |

OTHER PUBLICATIONS

A New Structure Type with Octahedron Pairs for Rh2S3, R2Se3, Acta Crystallographica 23(5), p. 832-40, 1967, E. Parthe, D. Hohnke and F. Hullinger.*

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

The cathode catalyst for a fuel cell of the present invention includes A-S—B, where A is selected from the group consisting of Ru, Rh, and combinations thereof, and B is selected from the group consisting of Se, Te, and combinations thereof.

19 Claims, 2 Drawing Sheets

CATALYST FOR A FUEL CELL, A METHOD OF PREPARING THE SAME, AND A MEMBRANE-ELECTRODE ASSEMBLY FOR A FUEL CELL AND A FUEL CELL SYSTEM INCLUDING THE SAME

CLAIM OF PRIORITY

This application claims priority to and the benefit of Korean Patent Application No. 10-2006-0048146 filed in the Korean Intellectual Property Office on May 29, 2006, the entire content of which is incorporated herein by reference.

BACKGROUND OF THE INVENTION

1. Field of the Invention

The present invention relates to a catalyst for a fuel cell, a method of preparing the same, a membrane-electrode assembly for a fuel cell, and a fuel cell system including the same. More particularly, the present invention relates to a cathode catalyst having an improved catalytic activity and selectivity for reduction of an oxidant, and a membrane-electrode assembly including the same.

2. Description of the Related Art

A fuel cell is a power generation system for producing electrical energy through an electrochemical redox reaction of an oxidant and hydrogen in a hydrocarbon-based material such as methanol, ethanol, or natural gas.

A fuel cell is a clean energy source that can replace fossil fuel energy sources. It includes a stack composed of unit cells and produces various ranges of power output. Since it has a four to ten times higher energy density than a small lithium battery it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell has an advantage of a high energy density and energy conversion efficiency, but it also has problems in the need to carefully handle hydrogen gas and the requirement of additional devices such as a fuel reforming processor for reforming methane or methanol, natural gas, and the like in order to produce hydrogen as the fuel gas.

On the contrary, a direct oxidation fuel cell has a lower energy density than that of the polymer electrolyte membrane fuel cell, but it has the advantages of easy handling of a fuel, being capable of operating at room temperature, and no need for additional fuel reforming processors. Therefore, it has been acknowledged as an appropriate system for a portable power source for small electrical devices.

In the above fuel cells, the stack that generates electricity substantially includes several to scores of unit cells stacked in multiple layers, and each unit cell is formed of a membrane-electrode assembly (MEA) and a separator (also referred to as a bipolar plate). The membrane-electrode assembly has an anode (also referred to as a "fuel electrode" or an "oxidation electrode") and a cathode (also referred to as an "air electrode" or a "reduction electrode") that are separated by a polymer electrolyte membrane.

A fuel is supplied to the anode and is adsorbed on catalysts of the anode, and the fuel is oxidized to produce protons and electrons. The electrons are transferred into the cathode via an external circuit, and the protons are also transferred into the cathode through the polymer electrolyte membrane. An oxidant is supplied to the cathode, and the oxidant, protons, and electrons are reacted on catalysts of the cathode to produce electricity along with water.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a catalyst.

Another embodiment of the present invention provides a membrane-electrode assembly for a fuel cell that includes the catalyst for a cathode.

Yet another embodiment of the present invention provides a fuel cell system that includes the membrane-electrode assembly.

According to one embodiment of the present invention, a catalyst includes A-S—B, where A is selected from the group consisting of Ru, Rh, and combinations thereof, and B is selected from the group consisting of Se, Te, and combinations thereof.

In one embodiment, the A-S—B is a solid solution. The catalyst of one embodiment includes 40 to 70 mol % of A, 10 to 20 mol % of S, and 10 to 50 mol % of B based on the total moles of the A, S and B. The catalyst of one embodiment has an average particle size ranging from 2 to 12 nm.

According to another embodiment of the present invention, a membrane-electrode assembly is provided that includes a cathode and an anode facing each other, and a polymer electrolyte membrane interposed therebetween. The cathode includes the above cathode catalyst. According to yet another embodiment of the present invention, a fuel cell system is provided that includes at least one electricity generating element, a fuel supplier, and an oxidant supplier. The electricity generating element includes a membrane-electrode assembly and separators arranged at each side thereof. The membrane-electrode assembly includes a cathode, an anode, and a polymer electrolyte membrane interposed therebetween. The cathode includes the above cathode catalyst.

According to yet another embodiment of the present invention, the catalyst is prepared by mixing a A source, a S source and a B source in a solvent to prepare a mixture, drying the mixture, and heat-treating the dried mixture. In one embodiment, the A source is selected from the group consisting of chlorides, nitrates, an acetylacetate salt, or a carbonyl compound including said A. In one embodiment, the S source is selected from the group consisting of a S powder, $CH_3CSNH_2$, and combinations thereof. In one embodiment, the A source and the S source are ruthenium thiol salt (Ru($C_2H_5SH$)). In one embodiment, the B source is selected from the group consisting of Se, Te, combinations thereof, oxides thereof. The drying is performed at 60 to 130° C., and the heat-treatment is performed at a temperature ranging from 200 to 400° C. for 1 to 5 hours.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
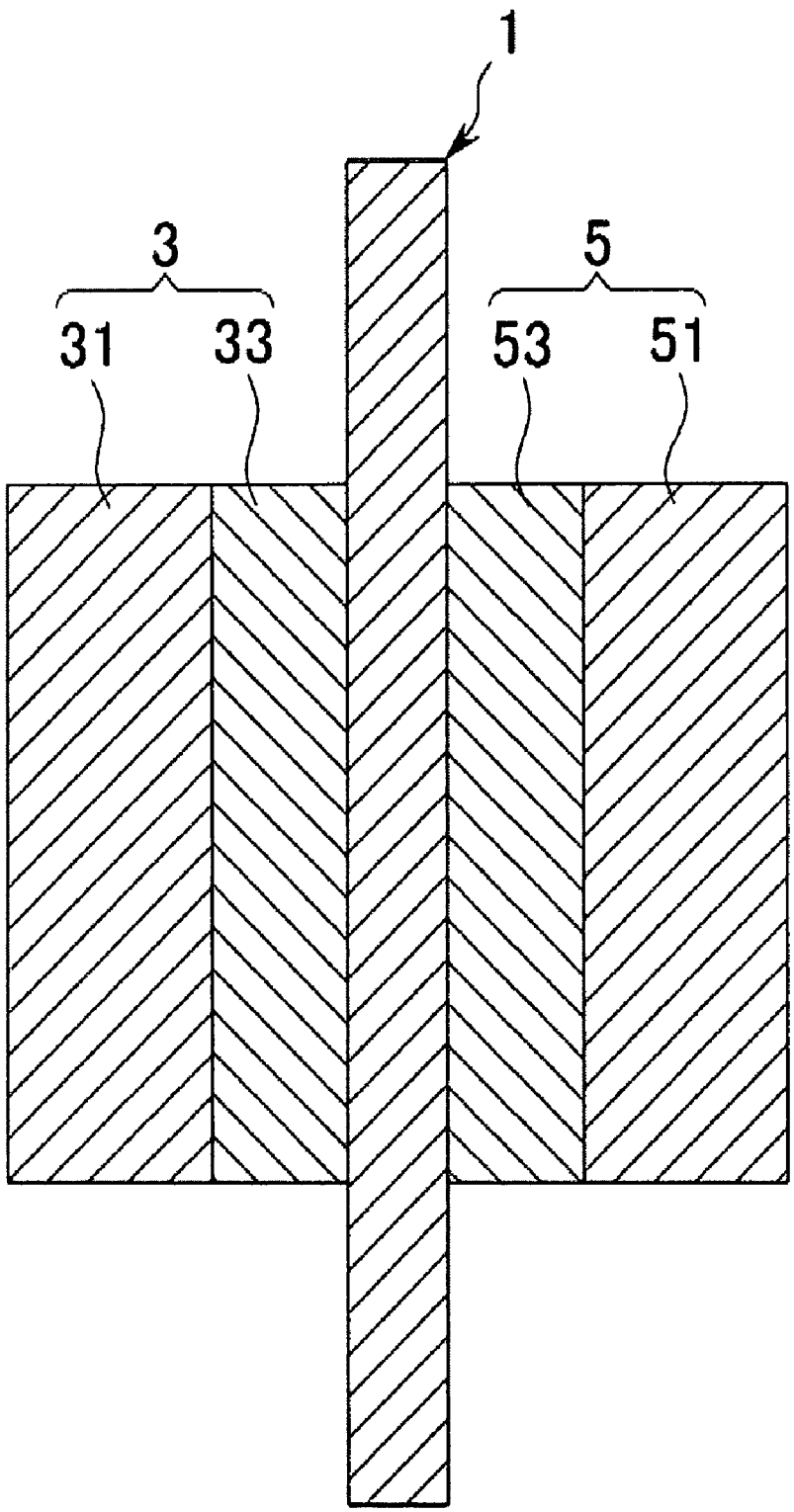
FIG. 1 is a schematic cross-sectional view showing a membrane-electrode assembly according to one embodiment of the present invention.

Embodiments of the present invention will hereinafter be described in detail with reference to the accompanying drawings.

A fuel cell is a power generation system for generating electrical energy through oxidation of fuel and reduction of an oxidant. The oxidation of the fuel occurs at an anode, while the reduction of the oxidant occurs at a cathode.

The anode includes a catalyst layer that includes a catalyst (which is also referred to as "anode catalyst") to catalyze the oxidation of the fuel. The cathode includes a catalyst layer that includes a catalyst (which is also referred to as "cathode catalyst") to catalyze the reduction of an oxidant. An example of the catalyst for the anode catalyst layer representatively includes platinum-ruthenium, and an example of the cathode catalyst for the cathode catalyst layer may include platinum.

However, the platinum as the cathode catalyst has a problem of low selectivity for reduction of an oxidant. It can also be depolarized by a fuel which came to the cathode through an electrolyte membrane so that the cathode catalyst may be inactivated in a direct oxidation fuel cell. Therefore, attention has been paid to another catalyst that can substitute for platinum.

According to one embodiment of the present invention, a cathode catalyst having excellent catalytic activity and selectivity for an oxidant reduction reaction is provided. The cathode catalyst according to one embodiment of the present invention includes A-S—B, where A is selected from the group consisting of Ru, Rh, and combinations thereof, and B is selected from the group consisting of Se, Te, and combinations thereof.

The catalyst may be a homogeneous-phased solid solution in which a S element and a Se element incorporate into the crystal lattice of Ru substitutionally, by replacing a Ru element in the lattice, or interstitially, by fitting into the space between Ru particles.

In general, a solid solution includes constituent elements which can be replaced with one another inside the atom structure. Accordingly, a Ru—S—Se catalyst according to one embodiment of the present invention includes S and Se which replace a Ru element inside the atom structure. In addition, these two elements form a covalent bond with Ru. Since the elements do not have the same particle size, they can cause some defects inside the structure of a solid solution. That is, the crystal lattice may be distorted, and the physical and electrical homogeneity of the solvent material may be affected. The more defects it has, the more active sites it may have. Accordingly, the catalyst may have increased activity.

In addition, the A-S—B catalyst includes A, which is a platinum-based element selected from the group consisting of Ru, Rh, and a combination thereof. The A has an active site with high surface energy, so that an oxidant can be reduced thereon. Accordingly, the platinum-based element, A, can have high catalyst activity for reduction of an oxidant. However, since oxygen in the air tends to be easily adsorbed to Ru, the oxygen in the air adsorbed to Ru can block the active center of Ru, resulting in deterioration of the catalytic activity of the platinum-based element. In addition, Ru may be inactivated by fuel that crosses over an electrolyte membrane in a direct oxidation fuel cell.

The S is bound with an A element and plays a role of preventing oxygen from being absorbed to the active center of the A, and at the same time, prevents the catalyst from being inactivated by an crossed-over fuel, and thereby imparting selectivity for reduction of an oxidant.

The B is selected from the group consisting of Se, Te, and a combination thereof, and plays a role of preventing oxygen in the air from being adsorbed to the active center of A, and thereby promoting reduction of an oxidant and suppressing reduction of fuel.

Therefore, a cathode catalyst of the embodiment of the present invention has an advantage of high activity and selectivity for reduction of an oxidant while not being activated by a fuel.

The A-S—B catalyst may include 40 to 70 mol % of A, 10 to 20 mol % of S, and 10 to 50 mol % of B, and preferably, 50 to 65 mol % of A, 15 to 20 mol % of S, and 20 to 40 mol % of B based on the total moles of A, B and S.

When the A is included in an amount less than 40 mol %, a catalyst may have deteriorated catalyst activity, while when more than 70 mol %, the catalyst may have deteriorated selectivity. When the S is included in an amount less than 10 mol %, it may be difficult to form a solid solution, while when more than 20 mol %, the S may cover the center of a catalyst, deteriorating catalyst activity. In addition, when the Se is included in an amount less than 10 mol %, it may be difficult to form a solid solution, while when more than 50 mol %, the Se may cover the center of a catalyst, deteriorating catalyst activity.

The catalyst may be used without a catalyst. For example, the catalyst may be a black type in which a catalyst is not supported on a carrier. It may have an average particle size of nanometers. It may preferably have an average particle size of 2 to 12 nm, and more preferably, 4 to 7 nm. When a catalyst has a particle size of less than 2 nm, the particles may be rapidly coagulated, resulting in increasing the size of a catalyst, while when more than 12 nm, a catalyst may have deteriorated activity.

Since the catalyst has very small-sized particles, and thereby an increased surface area for catalyst activity, it may have very high activity. In particular, the catalyst has higher activity than that of a Ru—Se catalyst, specifically a RuSe/C catalyst.

The cathode catalyst according to an embodiment of the present invention can be manufactured by a following exemplary method including mixing an A source, a S source, and a B source in a solvent, drying the resulting mixture to obtain a powder, and heat-treating the powder.

First, the A source, the S source, and the B source are mixed.

The A source may be chlorides, nitrates, an acetylacetate salt, or a carbonyl compound including an element selected from the group consisting of Ru, Rh, and combinations thereof. Non-limiting examples of the A source include ruthenium chloride, ruthenium acetyl acetonate, ruthenium nitrosylnitrate, H2RhCl4, and combinations thereof.

The S source includes a S powder, $CH_3CSNH_2$, and/or combinations thereof.

Alternatively, a ruthenium thiol salt (Ru(C2H5SH)) including both Ru and S may also be used.

The B source includes an element selected from Se, Te, and combinations thereof, or an oxide including the element.

Non-limiting examples of the B source include at least one of a Se powder, a Te powder, H2SeO3, H2TeO3, and combinations thereof.

The solvent includes an organic solvent such as an alcohol, such as methanol, ethanol, and so on, toluene, acetone, ethylene diamine, tetrahydrofuran, and so on.

Each source material of the constituting elements can be appropriately regulated depending on a desired amount ratio of each component in the final catalyst.

During the mixing process, each source material of the constituting elements should be sufficiently mixed. The mixing process may preferably include an ultrasound treatment.

Then, the prepared mixture is dried to be prepared into a powder.

The drying process may be performed at a temperature ranging from 60 to 130° C., and preferably, from 80 to 100° C. When the temperature is lower than 60° C., it can take too much time to perform the drying process, while when it is higher than 130° C., a catalyst may have an increased size due to coagulation of the particles therein.

Next, the dried powder is heat-treated to prepare a cathode catalyst according to an embodiment of the present invention.

The heat treatment may be performed at a temperature ranging from 200 to 400° C., and preferably, from 250 to 350° C. When the heat treatment is performed at a temperature of lower than 200° C., each element source used as a source material may not be sufficiently decomposed, while when it is higher than 400° C., the catalyst may have an increased size due to coagulation of the particles therein.

In addition, the heat treatment is performed for 1 to 5 hours. When the heat treatment is performed for less than 1 hour, each element source used as a source material may not be sufficiently decomposed, while when it is performed for more than 5 hours, the catalyst may have an increased size due to coagulation of the particles therein.

In addition, the heat treatment is performed under a reduction atmosphere of hydrogen, nitrogen, or a mixed gas thereof.

During the heat treatment, each element source is decomposed and thereby forms an A-S compound. The produced A-S compound reacts with B, forming an A-S—B cathode catalyst.

A cathode catalyst prepared by the above method has an excellent activity for reduction of an oxidant, and a high selectivity because it has no activity for oxidation of a hydrocarbon fuel. In other words, even though an unreacted hydrocarbon fuel crosses over a polymer electrolyte membrane, the hydrocarbon fuel is not likely to be oxidized.

Accordingly, the cathode catalyst can be effectively used as a cathode catalyst for a fuel cell. Specifically, a cathode catalyst of a fuel cell of the present invention may be used for a polymer electrolyte membrane fuel cell (PEMFC), a direct oxidation fuel cell (DOFC), and the like. In addition, it can be used for a mixed reactant fuel cell, in which oxidation of a fuel can occur only at an anode catalyst layer and reduction of an oxidant can occur only at a cathode catalyst layer, even though a mixture of a fuel and an oxidant is injected into both the anode catalyst layer and the cathode catalyst layer, by using a catalyst that can selectively work for oxidation of a fuel at the anode catalyst layer and also for reduction of an oxidant at the cathode catalyst layer.

According to one embodiment of the present invention, since the cathode catalyst has excellent selectivity for oxygen reduction, it can be more effectively used for a direct oxidation fuel cell having a cross-over problem of a fuel, and most effectively for a direct methanol fuel cell (DMFC).

According to another embodiment of the present invention, a membrane-electrode assembly includes the cathode catalyst.

The membrane-electrode assembly includes an anode and a cathode facing each other, and an electrolyte interposed therebetween. The anode and the cathode each include a conductive electrode substrate and a catalyst layer disposed thereon.

FIG. 1 is a schematic cross-sectional view showing a membrane-electrode assembly 131 according to one embodiment of the present invention. The membrane-electrode assembly 131 will be described in detail with reference to FIG. 1.

The membrane-electrode assembly 131 generates electricity through fuel oxidation and oxidant reduction, and one or more membrane-electrode assemblies constitute a stack.

At the cathode catalyst layer 53, which includes A-S—B, an oxidant reduction reaction occurs. The cathode catalyst has high activity and selectivity for a reduction reaction of an oxidant, and thus can effectively improve performance of the cathode 5, and thereby, the membrane-electrode assembly 131.

At the anode catalyst layer 33, a fuel oxidation reaction occurs, and it includes a general platinum-based catalyst for facilitating the reaction. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. In a direct oxidation fuel cell, since an anode catalyst may be poisoned by CO, CO-tolerant platinum-ruthenium alloy catalysts may be suitably used as the anode catalyst. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/RuNV, Pt/Fe/Co, Pt/Ru/Rh/Ni, Pt/Ru/Sn/W, and combinations thereof.

The anode catalyst may be used in a form of a metal itself (black type catalyst in which the catalyst is not supported on a carrier), or one supported in a carrier. The carrier may include carbon such as graphite, Denka Black, Ketjen Black, acetylene black, carbon nanotubes, carbon nanofiber, carbon nanowire, carbon nanoballs, or activated carbon, or an inorganic particulate such as alumina, silica, zirconia, or titania. Carbon is generally used.

The catalyst layers 33 and 53 of the anode 3 and the cathode 5 may include a binder resin to improve adherence and proton transfer properties.

The binder resin may be a proton conductive polymer resin. Non-limiting examples of the binder resin include a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the polymer resin include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen (H) in the ionic exchange group of the terminal end of the proton conductive polymer side chain can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such a substitution is known to this art, a detailed description is omitted.

The binder resins may be used singularly or in combination. They may be used along with non-conductive polymers to improve adherence to a the polymer electrolyte membrane. The binder resins may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrates 31 and 51 of the anode 3 and the cathode 5 provide paths for transferring the fuel and the oxidant to the catalyst layers 33 and 53. In one embodiment, the electrode substrates 31 and 51 are formed from material such as a carbon paper, a carbon cloth, a carbon felt, or a metal cloth which includes a porous film including a metal cloth fiber or a metallized polymer fiber), but are not limited thereto.

The electrode substrates 31 and 51 may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL, not shown) can be added between the aforementioned electrode substrates 31 and 51 and the catalyst layers 33 and 53 to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

A polymer electrolyte membrane 1 plays a role of exchanging ions by transferring protons produced at the anode catalyst layer 33 to the cathode catalyst layer 53.

The proton conductive polymer for the polymer electrolyte membrane 1 of the embodiment of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin for the polymer electrolyte membrane of the embodiment of the present invention include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer oftetrafluoroethylene and fluorovinylether having a sulfonic acid group, defluorinated polyetherketone sulfide, aryl ketone, poly(2,2'-(m-phenylene)-5, 5'-bibenzimidazole), and poly(2,5-benzimidazole).

The H can be replaced with Na, K, Li, Cs, or tetrabutylammonium in a proton conductive group of the proton conductive polymer. When the H is substituted by Na in an ion exchange group at the terminal end of the proton conductive group, NaOH is used. When the H is replaced with tetrabutylammonium, tributylammonium hydroxide is used. K, Li, or Cs can also be replaced by using appropriate compounds. Since methods of substituting H are known in this related art, the methods are not further described in detail.

According to another embodiment of the present invention, a fuel cell system including the above membrane-electrode assembly is provided.

A fuel cell system of an embodiment of the present invention includes at least one electricity generating element, a fuel supplier, and an oxidant supplier.

The electricity generating element includes a membrane-electrode assembly that includes a cathode, an anode a polymer electrolyte membrane positioned between the cathode and the anode, and separators positioned at both sides of the membrane-electrode assembly. It generates electricity through oxidation of a fuel and reduction of an oxidant.

The fuel supplier plays a role of supplying the electricity generating element with a fuel including hydrogen, and the oxidant supplier plays a role of supplying the electricity generating element with an oxidant. The oxidant includes oxygen or air.

The fuel includes liquid or gaseous hydrogen, or a hydrocarbon-based fuel such as methanol, ethanol, propanol, butanol, or natural gas.

The fuel cell system may be applied to a polymer electrolyte membrane fuel cell (PEMFC), a direct oxidation fuel cell (DOFC), or a mixed reactant fuel cell.

Figure 2:
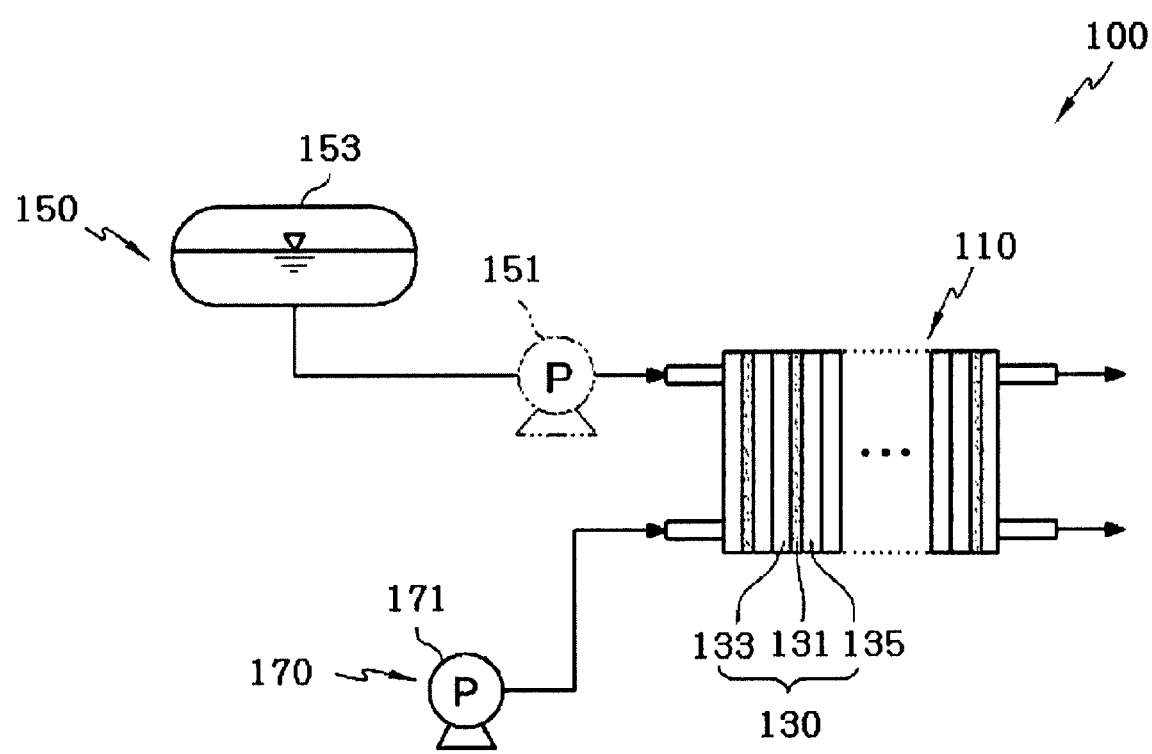
FIG. 2 schematically shows the structure of a fuel cell system according to one embodiment of the present invention.

FIG. 2 shows a schematic structure of a fuel cell system 100 that will be described in detail with reference to this accompanying drawing as follows. FIG. 2 illustrates a fuel cell system 100 wherein a fuel and an oxidant are provided to the electricity generating element 130 through pumps 151 and 171, but the present invention is not limited to such structures.

The fuel cell system of the present invention alternatively may include a structure wherein a fuel and an oxidant are provided in a diffusion manner.

The fuel cell system 100 includes a stack 110 composed of at least one electricity generating element 130 that generates electrical energy through an electrochemical reaction of fuel and an oxidant, a fuel supplier 150 for supplying the fuel to the electricity generating element 130, and an oxidant supplier 170 for supplying the oxidant to the electricity generating element 130.

In addition, the fuel supplier 150 is equipped with a tank 153, which stores fuel, and the fuel pump 151, which is connected therewith. The fuel pump 151 supplies fuel stored in the tank 153 with a predetermined pumping power.

The oxidant supplier 170, which supplies the electricity generating element 130 of the stack 110 with the oxidant, is equipped with at least one pump 171 for supplying the oxidant with a predetermined pumping power.

The electricity generating element 130 includes a membrane-electrode assembly 131, which oxidizes fuel such as hydrogen and reduces the oxidant, and separators 133 and 135 that are respectively positioned at each side of the membrane-electrode assembly and supply fuel such as hydrogen, and an oxidant, respectively. At least one electricity generating element 130 constitutes a stack 110.

The following examples illustrate the present invention in more detail. However, it is understood that the present invention is not limited by these examples.

EXAMPLE 1

0.06 g of selenium powder was dissolved in 150 ml of diamine, and 1 g of Ru(C2H5SH) was added thereto. The mixture was allowed to stand for one hour, and thereafter, treated with an ultrasound at 70° C. for 2 hours. The resulting mixture was dried at 80° C. for 24 hours to be prepared into a powder. The prepared powder was fired at 250° C. under a nitrogen atmosphere to prepare a Ru—S—Se catalyst.

The catalyst included 53 mol % of Ru, 17 mol % of S, and 30 mol % of Se based on the total moles of Ru, S and Se, and had an average particle diameter of 6 nm.

EXAMPLE 2

The catalyst was prepared according to the same method as in Example 1, except that the used amounts of the raw materials were controlled so that the catalyst might include 60 mol % of Ru, 10 mol % of S, and 30 mol % of Se based on the total moles of Ru, S and Se.

EXAMPLE 3

The catalyst was prepared according to the same method as in Example 1, except that the used amounts of the raw materials were controlled so that the catalyst might include 45 mol % of Ru, 20 mol % of S, and 35 mol % of Se based on the total moles of Ru, S and Se.

EXAMPLE 4

The catalyst was prepared according to the same method as in Example 1, except that the used amounts of the raw materials were controlled so that the catalyst might include 70 mol % of Ru, 15 mol % of S, and 15 mol % of Se based on the total moles of Ru, S and Se.

COMPARATIVE EXAMPLE 1

0.06 g of selenium powder was dissolved in 150 ml of ethylene diamine, and 1 g of Ru3 (CO) 12 was added thereto. The mixture was allowed to stand for one hour, and then Ig of Ketjen Black carrier was added thereto. The resulting mixture was refluxed at 100° C. for 48 hours. The refluxed product was filtered, and then the filtered product was dried at 80° C. for 24 hours to be prepared into a powder. The prepared powder was fired at 300° C. under a mixed gas atmosphere of hydrogen and 1 nitrogen in a volume ratio of 1:1 to prepare a RuSe/C cathode catalyst.

The catalyst included 81 mol % of Ru and 19 mol % of Se, and its amount supported on Ketjen Black was 47 wt %. In addition, it had an average particle size of 12 nm.

COMPARATIVE EXAMPLE 2

0.06 g of sulfur powder was dissolved in 150 ml of xylene, and 1 g of Ru3(CO) 12 was added thereto. The mixture was allowed to stand for one hour, and then Ig of Ketjen Black carrier was added thereto. The resulting mixture was refluxed at 100° C. for 48 hours. The refluxed product was filtered, and then the filtered product was dried at 80° C. for 24 hours to be prepared into a powder. The prepared powder was fired at 300° C. under a mixed gas atmosphere of hydrogen and nitrogen in a volume ratio of 1:1 to prepare a RuS/C cathode catalyst.

The catalyst included 79 mol % of Ru and 21 mol % of S, and its amount supported on Ketjen Black was 49 wt %. In addition, it had an average particle size of 14 nm.

Oxygen gas was bubbled into a sulfuric acid solution in 0.5M concentration for 2 hours to prepare an oxygen-saturated sulfuric acid solution. Then, each catalyst of Example 1 and Comparative Examples 1 and 2 was loaded in 3.78×10-3 mg on a glassy carbon to prepare a working electrode, while a platinum mesh was prepared as a counterpart electrode. Both of the electrodes were put in the oxygen-saturated sulfuric acid solution, and thereafter, measured regarding a current density while changing a voltage. The results are provided in the following Table 1.

TABLE 1

|  | Current density (mA/cm2, at 0.7 V) |
| --- | --- |
| Example 1 | 1.27 |
| Comparative Example 1 | 0.49 |
| Comparative Example 2 | 0.42 |

As shown in Table 1, the Ru—S—Se catalyst of Example 1 turned out to have a better current density than the RuSe/C catalyst of Comparative Example 1 and the RuS/C catalyst of Comparative Example 2. The catalysts according to Examples 2 to 4 had a similar catalyst activity to that of Example 1.

Therefore, the cathode catalyst for a fuel cell of the present invention had excellent catalytic activity and selectivity for the oxidant reduction reaction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell comprising: a cathode having a cathode catalyst, comprising A-S-B, where A is selected from the group consisting of Ru, Rh, and combinations thereof, and B is selected from the group consisting of Se, Te, and combinations thereof, and the catalyst comprises 40 to 70 mol % of A, 10 to 20 mol % of S, and 10 to 50 mol % of B based on the total moles of A, S and B; an anode facing the cathode; and an electrolyte membrane interposed between the cathode and the anode.

2. The fuel cell of claim 1, wherein the catalyst is a solid solution.

3. The fuel cell of claim 1, wherein the catalyst has an average particle size ranging from 2 to 12 nm.

4. The fuel cell of claim 1, wherein the catalyst is not supported by a carrier.

5. The fuel cell of claim 1, wherein the cathode comprising a conductive electrode substrate and a catalyst layer on the conductive electrode substrate, the catalyst layer comprising the cathode catalyst.

6. A fuel cell system comprising:
at least one electricity generating element, comprising:
a membrane-electrode assembly, comprising:
a cathode comprising a conductive electrode substrate and a catalyst layer on the conductive electrode substrate, the catalyst layer comprising a cathode catalyst comprised of A-S-B, where A is selected from the group consisting of Ru, Rh, and combinations thereof, and B is selected from the group consisting of Se, Te, and combinations thereof, wherein the cathode catalyst comprises 40 to 70 mol % of A, 10 to 20 mol % of S, and 10 to 50 mol % of B based on the total moles of A, S and B;
an anode facing the cathode; and
a polymer electrolyte membrane interposed between the cathode and the anode; and
separators positioned at each side of the membrane-electrode assembly;
a fuel supplier supplying the electricity generating element with fuel; and
an oxidant supplier supplying the electricity generating element with an oxidant.

7. The fuel cell system of claim 6, wherein the cathode catalyst is a solid solution.

8. The fuel cell system of claim 6, wherein the cathode catalyst has an average particle size ranging from 2 to 12 nm.

9. The fuel cell system of claim 6, which is selected from the group consisting of a polymer electrolyte fuel cell, a direct oxidation fuel cell, and a mixed reactant fuel cell.

10. The fuel cell system of claim 6, which is a direct oxidation fuel cell.

11. A method of manufacturing a fuel cell having catalyst comprising A-S-B,
where A is selected from the group consisting of Ru, Rh, and combinations thereof, and B is selected from the group consisting of Se, Te, and combinations thereof, the method comprising: preparing the catalyst by mixing a A source, a S source and a B source in a solvent to prepare a mixture, wherein A is in the range of 40 to 70 mol %, S is in the range of 10 to 20 mol %, and B is in the range of 10 to 50 mol % based on the total moles of A, S and B, drying the mixture; and heat-treating the dried mixture; preparing a cathode having the prepared catalyst; preparing an anode'; and preparing an electrolyte membrane interposed between the cathode and the anode to manufacture the fuel cell.

12. The method of claim 11, wherein the A source is selected from the group consisting of chlorides, nitrates, an acetylacetate salt, or a carbonyl compound including said A.

13. The method of claim 12, wherein the A source is selected from the group consisting of ruthenium chloride, ruthenium acetyl acetonate, ruthenium nitrosylnitrate, H2RhCl4, and combinations thereof.

14. The method of claim 11, wherein the S source is selected from the group consisting of a S powder, $CH_3CSNH_2$, and combinations thereof.

15. The method of claim 11, wherein the A source and the S source are ruthenium thiol salt ($Ru(C_2H_5SH)$).

16. The method of claim 11, wherein the B source is selected from the group consisting of Se, Te, combinations thereof, oxides thereof.

17. The method of claim 16, wherein the B source is selected from the group consisting of a Se powder, a Te powder, $H_2SeO_3$, $H_2TeO_3$, and combinations thereof.

18. The method of claim 11, wherein the drying is performed at 60 to 130° C., and the heat-treatment is performed at a temperature ranging from 200 to 400° C. for 1 to 5 hours.

19. A fuel cell comprising: a cathode having a cathode catalyst comprising A-S-B, where either (i) A is Rh, and B is selected from the group consisting of Se, Te, and combinations thereof, or (ii) A is selected from the group consisting of Ru, Rh, and combinations thereof, and B is Te; an anode facing the cathode; and an electrolyte membrane interposed between the cathode and the anode.

* * * * *